(12) United States Patent
Rees et al.

(10) Patent No.: US 9,211,545 B2
(45) Date of Patent: Dec. 15, 2015

(54) SYSTEM AND METHOD FOR RECLAIMING WASTE CARPET MATERIALS

(71) Applicant: Shaw Industries Group, Inc., Dalton, GA (US)

(72) Inventors: John Rees, Chattanooga, TN (US); Leonard Lee Hixon, Jr., Lookout Mountain, GA (US); Marten Hutchison, Tunnel Hill, GA (US)

(73) Assignee: Columbia Insurance Company, Omaha, NE (US)

( * ) Notice: Subject to any disclaimer, the term of this patent is extended or adjusted under 35 U.S.C. 154(b) by 87 days.

(21) Appl. No.: 13/776,583

(22) Filed: Feb. 25, 2013

(65) Prior Publication Data

US 2013/0327858 A1  Dec. 12, 2013

Related U.S. Application Data

(60) Provisional application No. 61/602,348, filed on Feb. 23, 2012.

(51) Int. Cl.

| | |
|---|---|
| B02C 18/00 | (2006.01) |
| B02C 23/08 | (2006.01) |
| D21B 1/06 | (2006.01) |
| B29B 17/02 | (2006.01) |
| B03B 9/06 | (2006.01) |
| B29L 31/00 | (2006.01) |
| B29K 77/00 | (2006.01) |

(52) U.S. Cl.
CPC ......... *B02C 18/0084* (2013.01); *B02C 18/0076* (2013.01); *B02C 23/08* (2013.01); *B29B 17/02* (2013.01); *D21B 1/061* (2013.01); *B02C 18/00* (2013.01); *B03B 2009/067* (2013.01); *B29K 2077/00* (2013.01); *B29L 2031/7322* (2013.01); *Y02W 30/622* (2015.05); *Y02W 30/667* (2015.05)

(58) Field of Classification Search
CPC ..... B02C 18/0076; D21B 1/061; D21B 1/063
USPC .................. 241/33, 200, 285.2, 285.322, 223
See application file for complete search history.

(56) References Cited

U.S. PATENT DOCUMENTS

| | | | | |
|---|---|---|---|---|
| 2,750,059 | A * | 6/1956 | Hintz et al. | 414/502 |
| 4,018,391 | A * | 4/1977 | Jacobsen | 241/152.2 |
| 4,067,506 | A * | 1/1978 | Cerroni | 241/200 |
| 5,551,825 | A * | 9/1996 | Montgomery | 414/412 |
| 5,964,563 | A * | 10/1999 | Bielagus et al. | 414/412 |
| 6,029,916 | A | 2/2000 | White | 241/24.19 |
| 6,227,468 | B1 * | 5/2001 | De Baat | 241/30 |
| 6,966,512 | B1 * | 11/2005 | Simpson | 241/200 |
| 7,784,719 | B1 | 8/2010 | Wingard | 241/20 |
| 2009/0017253 | A1 | 1/2009 | Bell | 428/87 |

OTHER PUBLICATIONS

U.S. Appl. No. 61/466,788, filed Mar. 23, 2011, Rees (Shaw Industries Group).

(Continued)

*Primary Examiner* — Faye Francis
(74) *Attorney, Agent, or Firm* — Ballard Spahr LLP

(57) ABSTRACT

The present invention relates generally to the reclaiming of carpet waste material. More particularly, the invention relates to a method and system for reclaiming carpet components such as yarn, tufting primary, binder, and secondary backing from post-industrial and post-consumer carpet waste in a substantially continuous flow process.

22 Claims, 4 Drawing Sheets

(56) References Cited

OTHER PUBLICATIONS

U.S. Appl. No. 61/555,241, filed Nov. 3, 2011, Rees (Shaw Industries Group).
U.S. Appl. No. 13/669,197, filed Nov. 5, 2012, Rees (Shaw Industries Group).
U.S. Appl. No. 14/575,503, filed Dec. 18, 2014, Rees (Shaw Industries Group).
U.S. Appl. No. 61/602,348, filed Feb. 23, 2012, Rees (Shaw Industries Group).
U.S. Appl. No. 14/596,750, filed Jan. 14, 2015, Rees (Shaw Industries Group).
Non-Final Office Action issued on Mar. 24, 2015 for U.S. Appl. No. 13/669,197 published as US 2013/0112790 (Applicant: Shaw Industries Group// Inventor: Rees et al.) (5 pages).
Amendment and Response to Non-Final Office Action filed on Feb. 20, 2015 for U.S. Appl. No. 13/669,197 published as US 2013/0112790 (Applicant: Shaw Industries Group// Inventor: Rees et al.) (13 pages).
Non-Final Office Action issued on Jan. 21, 2015 for U.S. Appl. No. 13/669,197 published as US 2013/0112790 (Applicant: Shaw Industries Group// Inventor: Rees et al.) (5 pages).
Response to Requirement for Restriction filed Dec. 18, 2014 for U.S. Appl. No. 13/669,197 published as US 2013/0112790 (Applicant: Shaw Industries Group// Inventor: Rees et al.) (3 pages).
Requirement for Restriction issued Dec. 8, 2014 for U.S. Appl. No. 13/669,197 published as US 2013/0112790 (Applicant: Shaw Industries Group// Inventor: Rees et al.) (5 pages).

\* cited by examiner

SYSTEM AND METHOD FOR RECLAIMING WASTE CARPET MATERIALS

CROSS-REFERENCE TO RELATED APPLICATION

This application claims the benefit of priority to U.S. Provisional Patent Application Ser. No. 61/555,241, filed on Nov. 3, 2011, the entire disclosure of which is incorporated by reference herein for all purposes.

FIELD OF THE INVENTION

The present invention relates generally to the reclamation of carpet waste material. More particularly, the invention relates to a method and system for reclaiming carpet components such as yarn, tufting primary and secondary backing for recycling.

BACKGROUND OF THE INVENTION

Waste material inflow into resource limited landfills is strained by the voluminous amount of post-consumer carpet waste produced by carpet distributors and carpet installation contractors and post-industrial carpet waste produced by carpet manufacturers. Post-industrial carpet waste can include, for example, commercial, industrial and residential carpet waste; manufacturing remnants; quality control failures, and the like. Post-consumer carpet waste can be, for example, used carpet, e.g., carpet removed from a home, apartment complex, or a commercial installation, or unused carpet, e.g., residual carpet left from an installation or manufacturing process. While most estimates indicate that carpet waste constitutes only 1 to 2% of all municipal solid waste, this amount still represents a vast quantity of waste that can have a substantial economic and environmental impact.

The carpet waste inflow into landfills is not generally environmentally beneficial. In an effort to mitigate the amount of carpet waste that is shipped to landfills, efforts are being made to manually recycle at least a portion of the carpet waste prior to insertion into the landfill waste stream. Recycling carpet, however, is difficult because its major components are chemically and physically diverse.

Most carpets comprise about 20-50 percent weight face fiber, the remainder being backing materials, commonly polypropylene, and an adhesive which attaches the carpet fiber to the backing material. The adhesive typically comprises a carboxylated styrene-butadiene (XSB) latex copolymer, and inorganic filler like calcium carbonate. These materials are frequently incompatible with each other in a recycling operation. For example, the means used to separate and reuse a layer of the backing material might affect the usefulness of the pile material. Alternatively, a chemical used in the recycling process might dissolve two or more of the components, causing them to intermix and form a blend of the two materials having less desirable properties. The application of heat to melt certain materials can have the same effect. Because of these difficulties, to date the amount of carpet reclaimed through recycling operations is limited and only a minimal percentage of the total carpet waste may be useful in the production of green technology products. Accordingly, there is a need for efficient recycling of post-industrial and post-consumer carpet waste to reduce the amount of waste being disposed of at landfills.

In light of the various shortcomings of prior attempts to effectively recycle spent carpeting, a need is recognized for a system and method capable of effectively and efficiently separating the constituent materials of used carpeting, so that those materials can be effectively recycled into new product with a minimum of discarded material and a minimum need to add virgin material to reduce contamination levels.

A further need is recognized for a scheme that makes effective and efficient use of the reclaimed materials in new carpeting. The need for virgin material should be kept to a minimum, in order to decrease costs and increase the amount of old material that is converted into new carpeting. In addition, such broad-based recycling methods can also potentially help to comport with National Sanitation Foundation (NSF) 140/2007 recommendations, which encourage carpet industries to develop sustainable carpet manufacturing and recycling programs for social, economic, and environmental benefits.

SUMMARY

The present system and method is capable of reclaiming heterogeneous carpet waste materials from streams of post-industrial and/or post-consumer carpet waste at higher levels of efficiency and lower levels of contamination than have previously been accomplished. To accomplish this, the invention provides a method and system for reclaiming carpet components such as yarn, tufting primary, binder, and secondary backing in a substantially continuous flow process.

As discussed above, carpet materials typically have several layers of different materials. The simplest types of carpet might have fibrous pile material (nylon, for example) fused directly to a thermoplastic primary backing material. However, there can also be a secondary binder or substrate layer, a reinforcing web material through which the pile is attached, or a separate glue material that is used to anchor the pile to the backing. The present invention is operative to separate the constituent materials, so that the separate types of materials can be recycled.

Additional embodiments of the invention will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

These and other features of the preferred embodiments of the invention will become more apparent in the detailed description in which reference is made to the appended drawings wherein.

DETAILED DESCRIPTION

Figure 1:
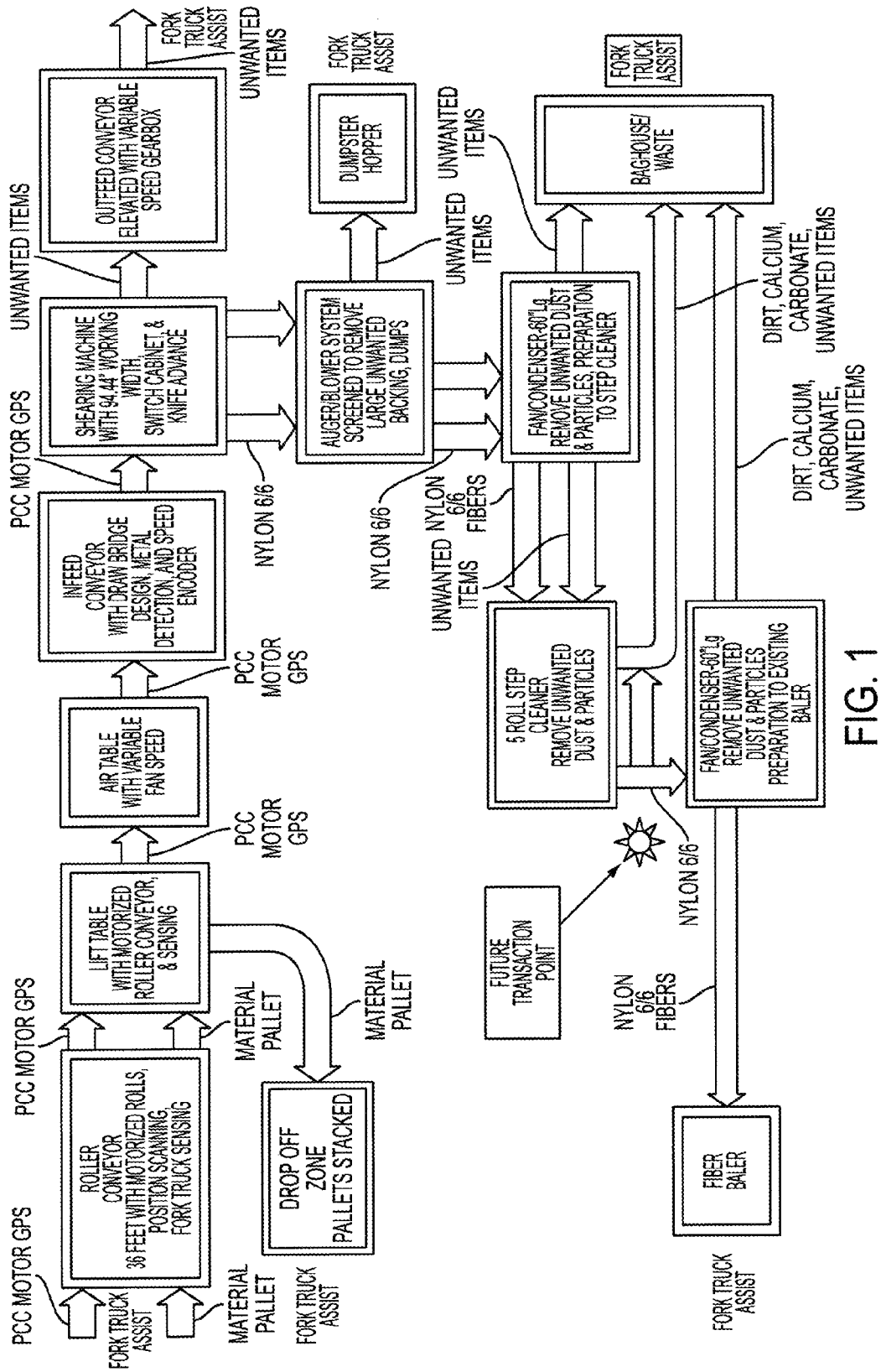
FIG. 1 is a schematic block diagram illustrating the steps performed in a carpet waste reclamation system.

The present invention may be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

As used in the specification and the appended claims, the singular forms "a," "an" and "the" include plural referents unless the context clearly dictates otherwise. Thus, for example, reference to a "waste stream" can include two or more such waste streams unless the context indicates otherwise.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Without the use of such exclusive terminology, the term "comprising" in the claims shall allow for the inclusion of any additional element—irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

As used herein, and unless the context clearly indicates otherwise, the term carpet is used to generically include broadloom carpet, carpet tiles, and even area rugs. To that "broadloom carpet" means a broadloom textile flooring product manufactured for and intended to be used in roll form. "Carpet tile" denotes a modular floor covering, conventionally in 18"×18," 24"×24" or 36"×36" squares, but other sizes and shapes are also within the scope of the present invention.

The present invention may be understood more readily by reference to the following detailed description of preferred embodiments of the invention and the examples included therein and to the Figures and their previous and following description.

FIG. 1 schematically illustrates a carpet waste reclamation method and system 100 according to one aspect of the present invention. As shown, carpet waste 10 is provided, such as the exemplary post-consumer carpet illustrated. However, it is contemplated that the carpet waste can be derived from any carpet. In one aspect, and without limitation, the carpet waste can be a post-consumer carpet, post-consumer processed, for example, carpet carcasses, and post-industrial, for example, selvedge, seams, and the like. It is contemplated that the carpet waste can also comprise manufacturing remnants, quality control failures, and the like. In a further aspect, carpet waste can comprise a carpet waste that would otherwise be discarded or land filled by a consumer, distributor, retailer, installer, and the like.

The carpet waste 10 can be derived from any desired carpet structure, including without limitation, tufted carpet, needle-punched carpet, and even hand woven carpet. In another aspect, the system and method described herein can be used in connection with broadloom carpets, carpet tiles, and even area rugs, so long as the carpet structure comprises at least one inorganic component desired for reclamation. In one aspect, a typical conventional carpet waste structure comprises fiber bundles, a primary backing material, an optional pre-coat layer, an adhesive backing material, an optional reinforcing layer, and an optional secondary backing material. In the present invention, it is contemplated that the carpet waste will be deconstructed or reclaimed into at least two primary waste streams, a face material or face fiber waste stream and a backing material having some degree of face fiber waste stream.

In one aspect, the carpet waste can comprise an inorganic filler component. The inorganic filler component can comprise, inter alia, calcium carbonate, calcium sulfate, calcium silicate, magnesium carbonate, magnesium oxide, magnesium hydroxide aluminum trihydrate, alumina, hydrated alumina, aluminum silicate, barium sulfate, barite, flyash, glass cullet, glass fiber and powder, metal powder, clay, silica or glass, fumed silica, talc, carbon black or graphite, fly ash, cement dust, feldspar, nepheline, zinc oxide, titanium dioxide, titanates, glass microspheres, chalk, and mixtures thereof. Among these, preferred fillers comprise calcium carbonate, barium sulfate, talc, silica/glass, alumina, and titanium dioxide, and mixtures thereof. More preferable fillers comprise calcium carbonate.

In another aspect, the filler can be ignition resistant. Exemplary ignition resistant fillers can comprise antimony oxide, decabromobiphenyl oxide, alumina trihydrate, magnesium hydroxide, borates, and halogenated compounds. Of these ignition resistant fillers, those that comprise alumina trihydrate and magnesium hydroxide are preferred.

Carpet waste can be provided to the system 100 in the form of bales. As one will appreciate, baled carpet waste can enhance the ease of the delivery and movement of the carpet waste. Optionally, the carpet waste can be provided to the system 100 palletized or in a loose or otherwise non-compacted condition. In one aspect, it is contemplated that the carpet waste can be provided to the system 100 in a stacked condition. It is also contemplated that landfill owners and/or operators can also provide incentives for stacking or baling of carpet to reduce the volume requirement of the landfill. In another option, the carpet waste can be provided to the system 100 in a stacked and size and/or fiber type sorted condition as described herein in the carpet waste preparation method and system 200 shown in FIG. 2.

Referring back to FIG. 1, once the carpet waste 10 is delivered to the system 100, the palletized carpet waste is placed in a stacked condition on a roller conveyor 15 and urged onto a lift table 20 that is configured to urge the carpet waste 10 downstream to an air table 25. This system is configured to accept stacked carpet waste pieces and to feed each individual flat piece of carpet waste downstream at a desired rate, in single form with correct orientation. The roller conveyor can be configured with a conventional pressure sensing system for monitoring the supply of delivered carpet waste and a fork truck sensing system. The lift table can be any conventional lift table or device that is capable of separating the stacked carpet waste from the pallets and urging the individual pieces of carpet waste material downstream to the air table. As one will appreciate, the air table can be any conventional air table or device that is capable of separating at least a portion of the contamination materials, such as dirt, present in post-consumer carpets from the constituent carpet materials. Any separated contamination materials are recovered for subsequent landfill processing.

Optionally, the system 100 can be configured to accept stacked carpet waste flats and to automatically feed the roller conveyor at a desired rate. In this aspect, the system can comprise a series of belts, rollers, and motors that are configured to individually feed each respective carpet waste flat onto the conveyor or downstream life table in single form with correct orientation. In one exemplary aspect, a gantry pick and place system can be used to pick up an individual carpet flat from a stack using pin grippers and is subsequently placed on a conveyor, slide chute or canted air table for feeding the system 100. In this aspect, optical sensors, inductive sensors, air pressure sensors and the like can be used to detect when to reverse the gantry after picking up or depositing a carpet waste flat. Conventional belt driven, rack and gear or linear actuators can be used for the required horizontal and/or vertical gantry movements.

Optionally, at least one fiber ID device 32 can be installed or otherwise configured in the pick and place head of the gantry pick and place system to automatically detect fiber type or along the infeed conveyor system 30. If a "wrong" fiber type is detected, the bad flat can be rejected to an off-line pile or sorted to the appropriate dedicated fiber type lane. The fiber ID device can, without limitation, exemplarily be a spectrophotometer for carpet as made by IKS Optoelektronik Mebgerate GmbH (Carpid), Polychromix (Phazir), Axsun Technologies (Anavo), Intevac (DeltaNu) and Bruker Optics (Carpet Analyzer).

In another option, it is contemplated that the infeed conveyor system 30 can comprise a multilane system can also be used for sorting flats for fiber type or color. In the case of fiber type, a fiber identification station with redundant infrared spectrum spectrophotometers scan, check and confirm the appropriate fiber type. The quality confirmed flat then works its way through the conveyance system to a downstream component waste separation system 40 dedicated to a specific fiber type. In this aspect, speed up conveyors, gap reducing sensors and multiple feed lanes in the infeed conveyor system 30 can be used to selectively operative to reduce gaps between respective carpet pieces along the way to the cutting zone of the shearing subsystem 55. Color sorting can be accomplished in a similar fashion, using color sensing spectrophotometers to determine, sort for color and direct the flat to the appropriate shearing subsystem 55 to be sheared.

After the air table, the carpet waste pieces are conveyed to the infeed conveyor system 30. In one aspect, the infeed conveyor system 30 can optionally comprise a means for sensing metal contaminants in the respective carpet waste pieces in each individual feed piece of carpet waste 10. In this aspect, since the downstream shearing subsystem 55 can be easily damaged by incoming metal contamination, the means for sensing metal contaminants can comprise a metal detector that is operatively integrated into the infeed conveyor system 30 to cull out carpet waste 10 with undesirable metal content. Exemplary metal detectors can include, without limitation, industrial metal detectors manufactured by Eriez, Fortress, Tectron, ADS and Rapiscan. In this aspect, it is contemplated that the infeed conveyor system 30 can further comprise a "metal-free" portion for passing the carpet waste flat and "metal-free" portion through the metal detector's center. If metal is detected, the computer control system 80 can direct the infeed conveyor system 30 to divert the contaminated carpet waste flat out of the system 100 as off-quality. Means for diverting the contaminated carpet waste flat can optionally include providing a chute at the end of one of the conveyors in the infeed conveyor system 30 that is configured to open a trap door to allow the contaminated carpet waste flat to exit out of the infeed conveyor system 30. Optionally, the contaminated carpet waste flat can be feed to the shearing subsystem and the shearing subsystem's cutting zone bottom roll can be lowered to allow the contaminated carpet waste flat to pass under the band blade of the shearing subsystem, thereby preventing shearing of the fiber on the contaminated carpet waste flat. In this aspect, by monitoring the feed speed and location of the metal contamination within a given carpet waste flat, the length of uncut material in the individual carpet waste flat can be significantly reduced and limited to the area spanning the width of the carpet waste flat immediately proximate to the metal contaminated area, plus or minus some small amount of reserve good material. Thus, in this latter aspect, the drop roll of the carpet waste separation system 40 would only kneel as the metal approaches and stay down long enough for the metal to pass by.

Optionally, the area of metal contamination can be cut out using fixed die cutter or slitting technique to cut around the metal with minimal waste. The reduced piece can then be passed back through the same or different metal detector a second time for confirmation of removal. The same process can be repeated again and again, if metal is detected a second or more times. As one will appreciate, the reduced carpet piece can be repeatedly passed through the system 100 to maximize fiber extraction from the carpet waste piece.

In another aspect, the infeed conveyor system 30 can optionally comprise a means for removing wrinkles from each individually feed piece of carpet waste 10. It is contemplated that the infeed conveyor system can comprise, without limitation, a sequentially positioned series of one or more of the following: slowed speed rollers or belts, crowned rollers, fluted rollers (bow and skew), driven belts, driven belts at angles, driven rollers at angles, low friction driven belts, high friction driven belts. As one will appreciate, slowed speed rollers or belts can be configured to progressively increase in speed as the material flows downstream through the infeed conveyor system, which dynamically applies force to the individual carpet waste pieces and thereby forcefully pulls out wrinkles in a direction parallel to the downstream machine directional flow. As one will also appreciate, sequentially positioned crowned and fluted bow and skew rollers can be configured to remove wrinkles in the width wise direction. Thus, it is contemplated that the integrated infeed conveyor system can be configured to spread, flatten, and stretch each individual piece of carpet waste. In a further aspect, it is contemplated that each roller can move relatively up or down, i.e., transverse, to the downstream machine directional flow for compliance for thickness or wrinkle presence. In this aspect, it is contemplated that infeed conveyor system can also comprise a means for selectively applying desired pressure in the up or down direction to the individual carpet waste pieces. Optionally, and without limitation, it is contemplated that the means for selectively applying desired pressure can be pneumatic, hydraulic, spring, weighted, and the like.

Subsequent to the infeed conveyor system 30, the flattened individual pieces of carpet waste are fed directly into the component waste separation system 40. In various aspects and referring to FIGS. 2-6, the component waste separation system 40 can comprise at least one of: a shearing infeed subsystem 50, a shearing subsystem 55, a carpet waste size sensing subsystem 60, a backing thickness sensing subsystem 65, a tuft height and tuft density sensing subsystem 70, and a waste stream output monitoring subsystem 75.

Figure 3:
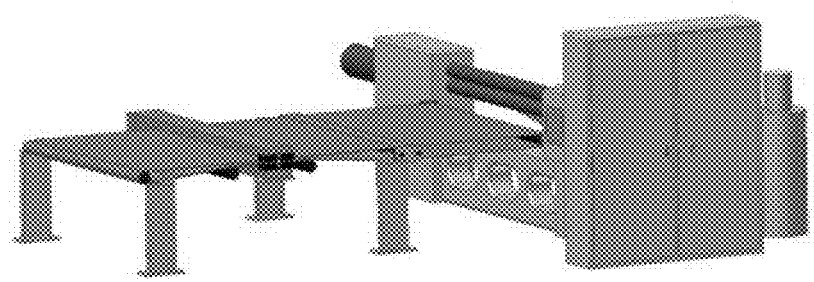
FIG. 3 is a schematic side perspective view of a component waste separation system of the carpet waste reclamation system, showing a shearing subsystem and a shearing infeed subsystem. In the illustrated example, a drawbridge of the shearing infeed subsystem is shown in the substantially horizontal run position.
Figure 4:
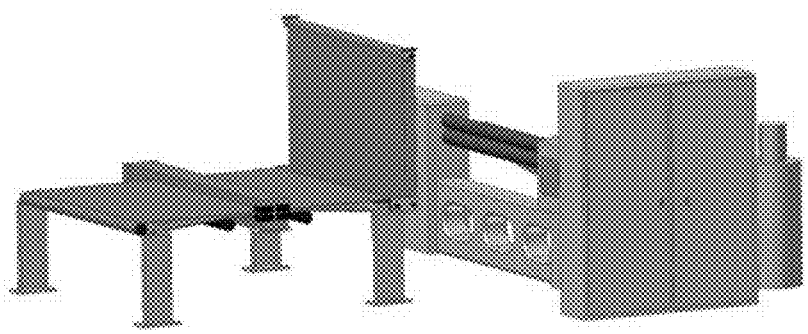
FIG. 4 is a schematic side perspective view of a component waste separation system showing the shearing subsystem and shearing infeed subsystem of FIG. 3, with the drawbridge of the shearing infeed subsystem shown in the substantially vertical maintenance position.
Figure 5:
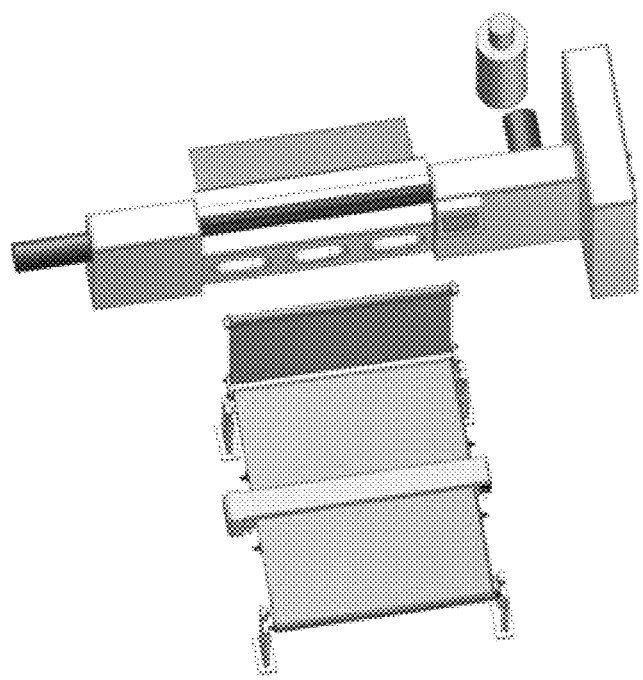
FIG. 5 is a schematic top perspective view of a component waste separation system showing the shearing subsystem and shearing infeed subsystem of FIG. 3, with the draw bridge of the shearing infeed subsystem shown in the substantially vertical maintenance position.

In one aspect, and as schematically shown in FIGS. 3-5, the carpet waste separation system 40 can comprise at least one shearing subsystem 55 with an operatively coupled shearing infeed subsystem 50. In one aspect, the shearing infeed subsystem 50 comprises means for selectively indexing individual flattened pieces of carpet waste through the component waste separation system 40. The means for selectively indexing individual flattened pieces of carpet waste through the component waste separation system 40 is configured to nip or otherwise convey the carpet waste as it is moved in the downstream machine direction to affect the desired control of the orientation and metering of the carpet waste material at a specified rate. In one aspect, the rate can be constant or can be controlled as desired for the respective carpet waste material that is passing though the component waste separation system 40.

In one exemplary aspect, the means for selectively indexing individual flattened pieces of carpet waste through the component waste separation system 40 can comprise a plurality of belts or pin rollers 52 that are positioned to maintain the individual carpet waste materials in a desired orientation while moving or otherwise urging the carpet waste material through the shearing subsystem 55. In one aspect, it is contemplated that the belt can be continuous or segmented across the face of the carpet waste piece. In another aspect, it is also contemplated that the belts or rollers 52 can have pins, flutes, grooves, high friction surface, grip surface or other conventional profiles for gripping and securing the carpet piece while urging the carpet waste material downstream.

In one aspect, it is contemplated that the plurality of belts or pin rollers can comprise two pluralities of belts or pin rollers 52', 52". As illustrated, in this embodiment, each plurality of belts or pin rollers are positioned substantially parallel to each other and the two pluralities of belts or pin rollers can be positioned, at least partially, in opposing, overlapping relationship to each other. Optionally, it is also contemplated that each plurality of belts or pin rollers can also comprise a means for selectively applying desired pressure in the up or down direction, i.e., transverse, to the downstream machine directional flow, to the individual carpet waste pieces in order to maintain the desired nip and to prevent slippage of the individual carpet waste pieces. Optionally, and without limita-tion, it is contemplated that the means for selectively applying desired pressure can be pneumatic, hydraulic, spring, weighted, and the like.

One skilled in the art will appreciate that, for the best results, shearing requires precut level same-plane flats of carpet waste. Thus, in order to maximize cut efficiency, it is contemplated that the infeed conveyor system 30 can comprise means for providing flat widths to the carpet waste separation system 40 to maximize the effective cutting width that the shearing subsystem 55 can accept. In this aspect, it is preferred to place the flats on the infeed conveyor system 30 in a manner that minimizes gaps between the flats, so that the band blade of the shearing subsystem is almost always has material feeding into it for shearing.

In one aspect, it is contemplated that the infeed conveyor system 30 can comprise multiple conveyors configured in series and on top of one another to minimize the "gapping" effect between the respective carpet waste pieces. For example, two stations can be configured to feed flats onto a station conveyor. Upon placement of a carpet waste flat on one station's conveyor, the placed flat can then transported to a series of speed up conveyors with optical proximity sensors controlling the stop and start points for feeding the flats at the maximum rate. Flats are indexed to a starting position, waiting to be fed onto the infeed conveyor system 30 when there is ample room for the other station's flat to pass. A second flat then is fed to the infeed conveyor system 30 with minimal gap, which helps to maintain maximum machine production throughput. In this aspect, and as one skilled in the art will appreciate, if the infeed conveyor system 30 comprises a metal detector is in series with the production feed from the flat operator stations, then the described carpet waste flat feed control system becomes more important for maintaining production levels. As one will appreciate, it a flat is rejected for metal contamination or wrong fiber type, a gap in the production feed can occur. To overcome these intentional machine induced gaps, the infeed conveyor system 30 can comprise a series of speed up conveyors, gap reducing sensors and multiple feed lanes, the gap from the missing and rejected flat can be overcome to maintain full production throughput, assuming that the multiple lanes of feed stock (minus the rejected flats) can keep up with the cutting speed. Thus, in one aspect, it is contemplated that multiple lanes of carpet waste flats, being fed in parallel, can be configured to distribute carpet waste flats onto a common single lane conveyor that supplies the component waste separation system 40. In this aspect, each multilane conveyor can take turns allocating their waste carpet flat content to the common main conveyor, with little gaps between flats.

In another aspect, if precut carpet waste flats produced by the carpet waste preparation method and system 200 are used in the system 100, the carpet waste flats can then be automatically fed to two separate lanes that are configured to feed the downstream shearing subsystem. In this aspect, each individual size of carpet waste flat can be delivered to the system 100 on a color coded pallet, and can be selectively and purposefully placed on the infeed conveyor system 30 with a corresponding appropriately sized carpet waste flat to maximize the cutting width of the band blade. In this aspect, it is contemplated that when the dimensioned carpet waste flats produced by the carpet waste preparation method and system 200 are placed on the infeed conveyor system, the outside edge of the conveyed carpet flats abut against the outside edge of the infeed conveyor system. This allows the various sizes of the dimensioned carpet waste flats produced by the carpet waste preparation method and system 200 to be run in two separate lanes with a minimal amount of space between flats end-to-end and side-to-side. Is this aspect, it is contemplated that sensors and/or machine vision cameras can be used to determine the optimal placement location and timing for each dimensioned carpet waste flat being placed on the infeed conveyor system.

In one exemplary aspect, the drawbridge of the shearing infeed subsystem 50 can be configured to be selectively raised about and between a substantially horizontal, run position and a substantially vertical, maintenance position. One skilled in the art will appreciate that conventional band blade systems typically require considerable time to change a band blade, replace a bond strip or remove a jam from the cutting zone of the machine. The reason for this, usually substantial, amount of maintenance downtime is due to the lack of reasonable maintenance access to the working or cutting part of the shear machine. Unlike conventional band blade systems, the selective movement of the drawbridge of the shearing infeed subsystem illustrated herein allows for easy and quick access to the machine front of the shearing subsystem that houses the conventional shearing system components that wear in operation. In one aspect, in the raised maintenance position, an aisle having suitable working dimension is formed between the raised shearing infeed subsystem and the machine front of the shearing subsystem. In one example, the formed aisle can have a three foot dimension along the machine direction.

In various aspects, the shearing infeed subsystem can be selectively driven by a motor that feeds the carpet waste flat material into the shearing subsystem. In one aspect, the motor can be coupled to a computer control system 80 configured to selectively speedup/down the conveyor motor as necessary to provide for substantially continuous feeding of carpet waste pieces to the shearing subsystem. The computer control system 80 can be, for example and without limitation, a centrally located Programmable Logic Controller (PLC), that is, without limitation, in communication with components of the shearing subsystem 55 such as, for example and without limitation, the respective carpet waste size sensing subsystem 60, a backing thickness sensing subsystem 65, a tuft height and tuft density sensing subsystem 70.

In one aspect, it is contemplated that the shearing infeed subsystem 50 can be selectively raised to the maintenance position by the selective actuation of pneumatic and or hydraulic cylinders, having optional rod locks for safety. As shown, the pivot point for the shearing infeed subsystem is in the center of the back drive roll of the conveyor. It is contemplated that the shearing infeed subsystem is capable of selectively being moving along any increment of up to 90 degrees off of the horizontal position. In this aspect, with the pneumatic system for selectively raising and lowering the shearing infeed subsystem, a safety dump slow start valve can be used for a quick response for de-energizing the rod locks, which allows the conveyor to dynamically move up or down with the roll. In one aspect, meter-out flow controls and blocking valves can be located at cylinder ports to increase operational safety.

Optionally, suitably configured hydraulics and motors with gearboxes can be used for the selective raising and lowering of the drawbridge of the shearing infeed subsystem about and between the operational run position and the maintenance position. In an additional option, a human powered counterweighted system can also be employed for the selective raising and lowering of the shearing infeed subsystem, without the use of auxiliary power.

In a further aspect, to further aid in enhancing the maintainability of the shearing subsystem to effect a contemporaneous reduction in down-time of the carpet waste reclamation system 100, the shearing infeed subsystem 50 can be mounted on movable bearings, which allow the shearing infeed subsystem to be operatively positioned, i.e., spaced, with respect to the feed entrance or machine front of the shearing subsystem to allow maximum control of the feed material to the cutting zone. In one aspect, these bearings can be configured to enable the shearing infeed subsystem to be moved further away from the machine, which can create a wider aisle. Optionally, the moveable bearings can be configured to also allow engagement pins to operatively engage with complementary locating cradles defined thereon the shearing subsystem to facilitate desirably matching the shearing infeed subsystem feed height to the track bottom roller height.

In another aspect, as the flats of the individual carpet waste pieces are being selectively feed into the machine front of the shearing subsystem 55, in is contemplated that the system 100 can comprise active means for adjusting the supply of the carpet waste flats to avoid damage to the downstream shearing band blade as a result of foreign materials, contaminates or "hard" spots in the respective individual respective individual carpet waste pieces. For example, a flat could have metal pieces, smeared on concrete, chewing gum, caulk, severe wrinkles, paint or other materials that could result in damage to the downstream band blade or could cause a jamming condition therewith the band blade.

In one aspect, the means for adjustment can comprise using a constant weight floating roller. Optionally, because the tuft density, pile height and size of the respective individual carpet waste pieces can change from piece to piece, the means for adjustment can preferably comprise allowing a top nip roller to comply, conform or float as hard pieces occur in each unique piece of carpet waste pieces. In this aspect, the nip pressure can be configured to be operatively varied depending on the respective pile height, tuft density and size of the carpet being sheared.

For example and without limitation, a smaller width carpet can cause a fixed weight roll to increase the force being applied to the smaller carpet waste pieces, which can crush or otherwise reduce the effective height of the pile of the carpet waste pieces and can increase the density of fiber that the band blade has to cut through. This increased fiber density can prematurely dull the band blade and can reduce the overall speed of the shearing operation. Conversely, larger dimensioned carpet waste pieces reduce the applied force, which allows the carpet waste pieces to slip within the nip zone and can cause irregular removal of fiber from the face and a possible jam condition. In one aspect, to enable the applied pressure applied by the top nip roller to be desirably varied, the carpet waste separation system 40 can further comprise at least one sensor configured to sense pile height, tuft density and/or flat size and to send signals indicative of same to the operatively coupled computer control system 80, which is configured to generate control signals in response to the sensor input to effect the configuration or setting of the desired pressure set point to a pneumatic proportional valve. In this aspect, the proportional valve is configured to accept an analog voltage control signal.

Optionally, a servo controlled linear motor or linear actuator can be provided and configured to selectively move up or down depending on the sensed physical properties of the carpet waste flat. In one aspect, it is contemplated that this embodiment would have fixed roll height condition at certain settings but would also provide for the roll height to selectively move up or down depending on the physical properties of the flat. In this aspect, a dampening cylinder can also be operatively coupled to the servo controlled linear motor or linear actuator to allow the top nip roller to compliantly move up and down based on pressure applied from a sudden increase in thickness, complying with hard spots in the carpet piece being processed.

It is also contemplated that oil dampeners, die springs and the like are additional methods for enabling the roll height to operatively move up or down to comply with height differences and prevent damage to the rollers or other machine parts. Optionally, hydraulic or pneumatic cylinders coupled to closed loop proportional or servo valves can also be configured to selectively move the top nip roller up or down to the desired position.

For example and without limitation, LVDT sensors (Linear Velocity Displacement Transducer), laser distance sensors or Magneto-Inductive Linear Position sensors, and the like can be used to monitor precise roll height locations. For example and without limitation, glass scale, magnetic scale and rotary encoders, and the like can be used to this roll location sensing. In another aspect, a pair of opposed sensors, for example being positioned on opposing sides of the roller, can be used to eliminate roller side-to-side skew.

In one aspect, the shearing subsystem 55 of the component waste separation system 40 can be configured to contact the incoming carpet waste pieces to remove or otherwise separate the face fiber or face materials from the primary backing material of the individual flattened carpet waste pieces.

In one aspect, it is contemplated that the shearing subsystem can comprise at least one band blade shear system that is conventionally configured to remove a desired portion of the face fiber/face material as the carpet waste is continuously and linearly moved downstream through the component waste separation system 40.

Optionally, the shearing subsystem can comprise at least one continuous rotating shearer or a segmented rotating shearer. In this aspect, at least a portion of each of the respective rotating or belt-type shearers has a conventional abrasion surface, which can be, for example and without limitation, a conventional grit surface that is bonded or otherwise coupled to at least a portion of the exterior surface of the wearer, and the like. It is also contemplated that the abrasion surface can be formed with a series of male flutes having hardened surfaces for extended wear life. In one aspect, the rotating wearer can have a large diameter for increased life and more surface contact.

In another aspect, the shearing subsystem can also comprise means for selectively moving the shearing subsystem and/or applying desired pressure in the up or down direction, i.e., transverse, to the downstream machine directional flow, to the individual carpet waste pieces in order to maintain the desired level of the band blade of the shearing subsystem relative to the primary backing of the individual carpet waste pieces. Optionally, and without limitation, it is contemplated that the means for selectively applying desired pressure can be pneumatic, hydraulic, spring, weighted, and the like.

It is contemplated that the speed of the shearing subsystem can be variably controlled to reduce fiber contamination in the shearing subsystems and to maximize the band blade cutting surfaces operational life. In one aspect, the variable control of the speed of the shearing subsystem can be selectively controlled in accord with signals received from the computer control system 80.

In a further aspect, the shearing subsystem 55 can further comprises a means for minimizing trapped contamination between the rotating band blade and the drive apparatus of the shearing subsystem. As one skilled in the art will appreciate, conventional skiving and shearing machines use two large diameter opposing drive wheels to drive the circulating band blade. Typically, each drive wheel contacts the band blade through about 180 degrees of contact and a wedge shaped bond strip underlies and supports the band blade in the otherwise unsupported span between the opposing drive wheels. The wedge shaped bond strip is configured to guide, support and protects the top and bottom sides of the running band blade. Conventional bond strips generally extend the width of the shearing machine and most of the exposed area of the band blade and are known to have a propensity to become jammed with contaminates in the small gap that exists between the running band blade and the front bottom and top edges of the wedge shape bond strip. Conventional bond strips also have a tendency to wear from the rubbing effect of a running band blade gradually wearing off metal and increasing the size of the "gap" over time, which can allow for more contamination to become trapped and can ultimately allow jams to occur.

In one exemplary aspect, the means for minimizing trapped contamination can comprise the use of a segmented bond strip in the shearing subsystem that is configured to allow contaminates to be carried out from between the plurality of bond strip segments that form the segmented bond strip and thereby aids in making the shearing subsystem more self-cleaning. In this aspect, a mounting bar is positioned to precisely position the ground edges of the respective shorter bond strip segments relative to a common net point. In another aspect, each bond strip segment can also include a means for advancing the blade as material loss occurs from the sharpening process and wear. Optionally, at least one operatively coupled tempered metal wiper can be configured to squeegee off extraneous fiber from the bond strip segments to help prevent or minimize fiber or contaminate based jams.

In another exemplary aspect, the segmented bond strip can be configured to allow for the use of replaceable inserts in the individual bond strip segments, which reduces consumable wearable part costs. For example and without limitation, the insert can be made from carbide, ceramics, hardened steel, and the like, or, optionally, the insert can have diamond or other suitable hard coatings. In is contemplated that each insert can be configured to have precision ground net points and can have a suitable means for selectively mounting or otherwise coupling the insert to the segmented bond strip.

In another exemplary aspect, the means for minimizing trapped contamination can comprise the use of fluted slots that are formed on the band blade contact surface of both the top and bottom bond strips and that allow for the ability of self-cleaning of contaminates from the shearing subsystem. In one aspect, the formed slots or grooves can be formed at a diagonal to the blade travel direction. Optionally, the cross-sectional groove profile for the respective grooves can be at least partially round, true "V", square, rectangular, round tip "V", and the like. Of course, other geometric cross-sectional shapes of the grooves suitable to accomplish the self-cleaning effect are contemplated. Operationally, as particles are deposited into each groove, the moving action of the band blade helps carry and move the particles along the length of the groove, finally exiting the groove end and avoiding a jam condition.

In another exemplary aspect, the means for minimizing trapped contamination can comprise the use of movable bond strips that can be selectively opened at preset or as-needed intervals. In one example, the movable bond strips can be configured to open about a common or dual offset pivot point. Optionally, the moveable bond strips can be configured to physically move each bond strip up or down and away from the band blade to create a gap wide enough to manually or automatically clean and remove any captured contaminate material. In a further aspect, a scraper, squeegee, or the like can be configured to run the operative elongate length of the contaminated bond strip edges to restore the surfaces to a clean condition.

In another exemplary aspect, the means for minimizing trapped contamination can comprise the use of compressed air. In this aspect, compressed air can be selectively ported to desired portions of the bond strip to clean and remove any captured contaminate material from the system. It is contemplated that the frequency and/or selection of the application of the compressed air can selectively occur at preset intervals or on an as-needed basis. Optionally, the respective ports can be supplied with compressed air at one time-to-all, staggered or pulsed cleansing schedules to properly clean and cool the band blade and bond strip assembly.

Optionally, the means for minimizing trapped contamination can comprise the use of a common blade bar and bond strip assembly that is configured to allow for a manual quick-change by maintenance personnel. In this aspect, the common blade bar and bond strip assembly is configured, using net points, dowel pins, diamond plane datum's, and the like, to provide precision alignment of the assembly sub components.

To further extend the intervals between required maintenance intervals of the band blade, the shearing subsystem 55 can further comprise a band blade cooling system that uses a low molecular weight mineral oil (220° C.) as a blade lubricant to reduce friction between the blade and bond strip and between the blade and fiber being cut to extend the band blade operational life. For precise control, the blade lubricant can be selectively metered with a pump, flow control valve, pressure tank and the like. Optionally, to remove contaminates from the band blade while running, a roll of absorbent pad material that is in operative contact with the band blade can be automatically indexed to renew with clean pad material. Optionally, compressed air or forced air blowers can also be operatively used as an air knife to remove contaminants and to cool the band blade.

In an additional effort to further extend the intervals between required maintenance intervals of the band blade, the shearing subsystem 55 can further comprise a quick-change blade system. As one skilled in the art will appreciate, one of the major contributors to downtime of a conventional shearing machine is the inordinate amount of time required to change a band blade, which can range from a few hours to a few weeks depending on the material being cut. In the case of processing post-consumer waste carpet pieces, the blade replacement frequency is approximately every 7 to 8 hours of run time and the time to replace a blade typically ranges from 30 minutes to 1 hour. Thus, if the machine was producing at a rate of 1000 pounds per hour, then the production loss due to a blade change equates to 750 lbs of lost production per 8 hour shift, 2250 pounds per day or 562,500 pounds per year. As one will appreciate, any reduction of the time required to change the band blade can result in significant savings per year.

In one aspect, the shearing subsystem 55 of the carpet waste reclamation system 100 can comprise a means for reducing the time to change the band blade of the shearing subsystem. In one aspect, the means for reducing the change time comprises dulling the existing blade for safe removal, which can be manually accomplished by placing a piece of metal, ceramic or other hard material into contact with the existing, running band blade. Optionally, to maximize safety factors, the band blade can be automatically and selectively engage via a pneumatic, hydraulic, electrical, or otherwise actuated dulling tool, which can be a hard surface object or a rotating grinding wheel. Next, sufficient or adequate maintenance space is opened at the machine front of the shearing subsystem. In one aspect, the shearing infeed subsystem can be raised to the maintenance position as described previously herein to create the maintenance aisle sized to provide easy access to the band blade. Subsequently, all component obstructions of the shearing subsystem such as, for example and without limitation, nip roll drive couplings, machine guarding, blade cleaning devices, lubricators, position sensors, and the like, should be removed or otherwise relocated to allow the band blade to be detached without interference.

Next, tension is removed from the existing blade using conventional hydraulic or pneumatic means to relieve the tensioning pressure on the band blade and to allow for the removal of the existing band blade from the shearing subsystem's self-aligning drive rolls. In operation, when the existing blade is free to be separated, a first cart can be moved to the front of the shearing subsystem and can be aligned with the shearing subsystem via, for example and without limitation, pins, rails and the like. The first cart can be selectively fixed in the aligned position to prevent movement of the first cart during the band blade removal process. A means for removal, either built-in to the first cart or as part of the shearing subsystem substantially engages the existing band blade and transfers the band blade from the drive wheels of the shearing subsystem to mounting means on the cart.

In a further aspect, and when time allows, the first cart can be decoupled from the shearing subsystem and removed, with the dulled older blade mounted thereon, from the proximity of the shearing subsystem. It is contemplated that the first cart can further comprise metal shear cutters powered by electrical, pneumatic or hydraulic means for reducing the oval length of band blade to short metal sections that are suitable for disposal or recycling.

Optionally, the decoupled first cart, with the dulled older blade mounted thereon, can be moved to a wall mounted or free standing cutting station, which allows the first cart to be secured relative to the cutting station. In this process, the cutting station can comprise sensors configured to detect that the first cart is in the proper and safe operational position. Subsequently, metal shear cutters powered by electrical, pneumatic or hydraulic means and mounted on the wall mounted or free standing cutting station can be actuated to reduce the oval length of band blade to short lengths by reaching into the first cart and cutting the long blade to short manageable sections. All reduced metal pieces can then be automatically or manually removed from the first cart for disposal or recycling.

Upon separation of the first cart from the shearing subsystem, a second cart, already preloaded with a new blade can be moved into the proper loading position on the shearing subsystem. Conventionally and for safety reasons, partially sharpened or chamfered but still dull blades are typically installed on the shearing subsystem. In one aspect, a grinding system with twin grinding wheels can subsequently be used to sharpen the blade to the correct level of sharpness. This operation, if manually done, requires an operator to manually adjust the engagement position and amount of each individual grinding wheel to the band blade and can take approximately 30 minutes.

Optionally, in order to further reduce machine downtime, the second cart can initially be taken to a sharpening station [not shown] that is separated from the shearing subsystem 55 and that is configured to operatively engage and secure the cart in a desired position so that the band blade can be pre-sharpened prior to loading on the shearing subsystem. It is contemplated that the second cart can comprise a shielded cavity that is configured to temporarily house the pre-sharpened band blade for the operator's protection. In this aspect, after the pre-sharpening is completed, the second cart can be operatively selectively coupled to the front of the shearing subsystem to allow the transfer of the pre-sharpened band blade to the shearing subsystem's self-aligning drive rolls.

Optionally, a second cart mounted manual or automatic band blade transfer means can be used to position the new band blade onto the shearing subsystem's drive rolls in the correct position with the back edge netted to the blade advance gibs. Subsequently, the second cart is moved away from shearing subsystem and tension is reapplied to the coupled new band blade. Subsequently, all component obstructions of the shearing subsystem such as, for example and without limitation, nip roll drive couplings, machine guarding, blade cleaning devices, lubricators, position sensors, and the like, that had been previously removed otherwise relocated should be operatively recoupled to place the shearing subsystem back into operative condition. Lastly, the shearing infeed subsystem can be moved back to the operational position and the component waste separation system 40 can be brought on-line.

In a further aspect, the shearing subsystem 55 can also comprise a means for maintaining the band blade at a desired degree of sharpness. Such a means can comprise a dual grinding wheel system that is configured to sharpen the blade from two opposing sides by gradually removing metal to form a desired chiseled cross-sectional sharp point. As one skilled in the art will appreciate, as the metal of the band blade erodes away in use, the band blade effective width becomes narrower and the cutting position within the shearing subsystem changes. Using conventional means to maintain the proper cutting position, the band blade can be advanced automatically upon need into and driven forward by a combination and series of setting gibs, worm gears, brass nuts, brass screws and a common drive shaft. However, the conventional means to maintain the proper cutting position described herein is susceptible to jamming up or galling from contamination particles getting trapped between individual components of the means when running conventional carpet waste material.

To increase reliability and, hence, machine uptime, the shearing subsystem 55 described herein comprises means for reliably advancing the blade and reducing the conventional blade advance systems sensitivity to contamination. In one aspect, a plurality of adjustment cylinders is mounted on a common bar that is configured to be moved by at least one additional hydraulic, pneumatic or air-over-oil datum cylinder or servo motor linear actuator. In this aspect, the at least one main datum cylinder or actuator can be positioned in a home position in which the band blade is mounted thereto and tension applied.

In one aspect, it is contemplated that the computer control system 80 can be coupled to a touch screen that has a suitable touch screen button to effect actuation of a blade calibration mode. Actuation of the blade calibration mode signals the shearing subsystem 55 to power on to drive the band blade. Operatively coupled optical sensors under programmed control then index the at least one datum cylinder or actuator, using proportional valves or servo controllers, to move to the proper operating position whereupon at least one pneumatic cylinder with a coupled rod lock clamping device automatically and selectively lock in place. This procedure accurately sets the home starting position. Optionally, the home starting position can be set is to form a common mounting bar, via CNC machine, precision grinding, and the like, to precise dimensions. In this aspect, it is contemplated that individual gibs assemblies with a built-in linear adjustment means can be accurately netted to a common plane in 3D space using a portable Faro/Romer CMM arm.

In another optional aspect, the shearing subsystem 55 can comprise means for reducing the conventional blade advance systems sensitivity to contamination that includes selectively pressurizing the blade advance zone to create an air dam suitable to prevent the contaminant from entering the band blade work area. In various aspect, grooves, holes or ports can be strategically positioned proximate the band blade work area to selectively direct flow compressed air to prevent particulate matter from entering the blade-to-bond strip zone. As one will appreciate, the formed air dam or air band effect can also help remove contaminant from the band blade as it travels back and forth across the machine width and can help to cool the blade.

Conventional shearing machines incorporating a band blade are typically manually sharpened to maintain machine speed and cut quality. For example, for a Fecken Kirfel shearing machine, two opposing grinding wheels dynamically grind the moving band from both sides of the band blade as the never-ending band is continuously moved past the grinding wheels to create a sharp beveled edge. In this machine, each grinding wheel is mounted on a pivoting bracket, which allows the operator to manually provide for the gradual engagement of the grinding wheels at the proper angle. Operatively, the operator manually moves each grinding wheel into engagement with the band blade and uses spark output, sound and feel to know how much to engage the grinding wheel to the band blade.

Here, in one aspect, it is contemplated that the grinding operation suitable for maintaining the band blade at the desired degree of sharpness can be fully automated. In this aspect, the first step is to automatically sense the band blades sharpness. In one example, a retro reflective optical infrared sensor can be used to ping the leading edge of the band blade with light and to optically sense the amount of reflectivity back into the sensor. In this aspect, compressed air dams or air knives can be configured to keep optical sensor free of any thrown off contamination or lubricating oil. As the blade dulls, more light can be picked up, which causes the coupled computer control system 80 to direct an analog signal to the grinding system to initiate and to control the degree of grinding. Optionally, it is contemplated that inductive sensors with an analog signal output can be used to generate an analog signal based on the degree of blade sharpness. In this aspect, it is contemplated that the sensor will be positioned a fixed distance away from the leading edge of the band blade.

At initiation of the grinding process, a grinding wheel home position is established. In this aspect, optical or inductive sensors are configured to allow each grinding wheel to be driven with a motor to a specific coarse starting location in close proximity to the band blade edge. Under computer control system 80 direction, the remaining fine adjustment of the grinding wheel location is then accomplished by effecting a precise and slow engagement of the grinding wheels using at least one of the following sensing methods: blade sharpness, spark intensity (spark specular light detection), vibration sensing, sound or motor load, and the like. In this aspect, based on the analog signal output from conventional photo, sound, amperage or accelerometer sensors, the grinding force and/or distance will be shifted accordingly under positive input from the computer control system 80.

However, it is contemplated that, once enough historical data is collected, a grinding frequency and time interval and application can be used in lieu of ancillary sensing methods. Optionally, grinding force and wheel rotational speed are other variables that can be proportionally adjusted for optimal blade sharpening. In another optional aspect, AC inverters, DC drives, servo controllers, stepper drives, and the like can be used as the motor for driving the grinder wheel rotation. In another aspect, it is contemplated to use a programmed closed loop control of the grinder motor rotational speed relative to the blade speed for optimal, controllable and predictable grinding results. As one will appreciate, the historical data, grinding force, speed, engagement distance, grinding frequency, grinding time, machine uptime, production output, and the like, can all be factored in the computer control system 80 to predict when and how long to sharpen the band blade.

In another aspect, if machine speed is a limiting factor due to blade sharpness, the shearing subsystem 55 can comprise at least two separate grinding wheel drive systems per blade side. Optionally, wider grinding wheels can be used to add more grinding ability without adding additional motors. This aspect can require the use of higher power motors due to the increased grind rock surface area in contact with the blade and, therefore, increase motor load.

One skilled in the art will appreciate that particles of metal dust, other materials or contaminates gradually build up in and on the outer cylindrical surface of the respecting grinding wheels as the grinding wheels wear down from abrading or otherwise sharpening the band blade. This contamination can reduce grinding efficiency and can decrease the ability of the grinding system to maintain blade sharpness at higher operating speeds. In order to clean the grinding wheel, a conventional Feckin Kirfel shearing machine uses a diamond pointed tool that is manually directed to cut off the contamination layer of material on the outside of the cylindrical surface of the wheel. In operation, the material removal tip of the diamond pointed tool is manually moved closer to the grinding wheel's surface, which removes a desired portion of the surface along the way. In this way, the material removal tip can be manually swept across the entire width of the wheel's outer surface to allow the full width of the wheel's outer surface to be redressed.

Here, in one aspect, it is contemplated that the grinding wheel dressing operation suitable for maintaining the grinding wheel surface in the desired condition can be fully automated. In one aspect, a servo or stepper motor can be configured to engage the material removal tip of the diamond pointed tool with desired portions of the respective grinding wheel and to articulate along a sweeping action for wheel surface renewal. In this aspect, the servo or stepper motor can be configured to drive small linear actuators, ball screws, cams, and the like to controllable move the material removal tip of the diamond pointed tool in both the perpendicular engagement and horizontal sweeping directions.

Optionally, it is contemplated that hydraulic and pneumatic linear actuators coupled to proportional valves and associated closed loop sensing can be used for the positive controlled movement material removal tip of the diamond pointed tool redressing the wheel surface.

Another option is to reduce the relative hardness of the grinding wheels. In this aspect, it is contemplated that the hardness of the grinding wheels would be selected to allow for the wear rate of the wheel to operatively match the accumulation rate of contamination. Thus, in this aspect, the grinding wheel wears at the same rate as the accumulation such that any accumulation is carried off as grinding wheel waste material.

In various optional aspects, the wheel dressing start frequency can be calculated based on actual machine run and grind time historical data or by sensing surface color differences or optical retro reflectivity changes. Once known data has been collected, a predictable maintenance schedule for the wheel's dressing frequency, wheel's replacement frequency and diamond tip replacement frequency can all be programmed into the system processor. In another aspect, the computer control system 80 can feed data to a built-in touchscreen, HMI display or separate digital readout to predictably count down when these maintenance events need to happen.

In various aspects, to maximize throughput and quality of the shearing subsystem, several parameters can be sensed in real time as data inputs. In one aspect, the sensed data inputs can include one or more of: backing thickness, pile height, pile density, incoming PCC flat piece width and motor load. Based on the sensed input data, the applied upper nip roll force and engagement distance of the shearing subsystem can be determined by the computer control system 80 for optimal waste processing conditions.

The carpet waste size sensing subsystem 60 of the component waste separation system 40 can comprise at least one of a computer vision system, a sensor array, or a mechanical fingers (or heddles) to detect the width of each flattened carpet waste piece. The carpet waste size sensing subsystem 60 is in communication with the computer control system 80 to provide immediate and real-time system adjustments to the respective components of the component waste separation system 40 for the optimized downstream shearing and waste stream separation. In one aspect, it is contemplated that a plurality of laser displacement sensors can be mounted at six inch intervals across the width of the shearing subsystem (transverse to the machine direction) adjacent to and upstream of the nip rollers. In this aspect, the laser displacement sensors are configured to detect and signal the computer control system 80 to calculate width utilization efficiency, length utilization efficiency, production throughput and targeted nip roll pressure. It is also contemplated, based on input signals from the carpet waste size sensing subsystem 60, that the computer control system 80 can signal the shearing subsystem to adjust the electrical, pneumatic or hydraulic location of the top nip roller in relation to a desired shearing cut zone in order to maximize face fiber yield, polymer purity, throughput, blade life and production consistency. In one aspect, the data used in the carpet waste size sensing subsystem 60 can be used in conjunction with the tuft height and tuft density sensing system input data. It is contemplated that other sensing mechanisms can also be employed for the means for automatically detecting the thickness of the backing material of the carpet waste piece.

Figure 6:
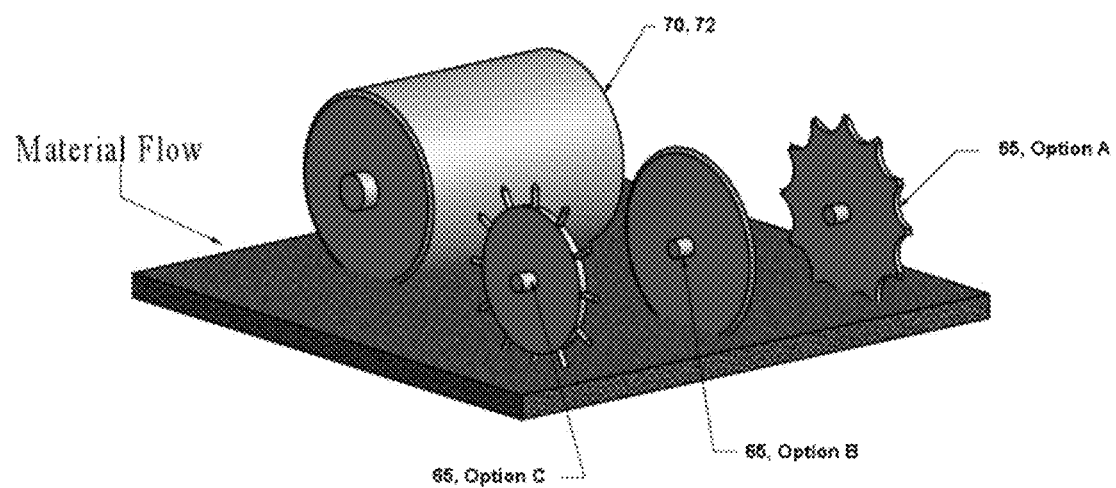
FIG. 6 is a schematic representation of exemplary methods and systems for sensing the tuft height of the fiber material, the density of the carpet, and the backing material height.

In one aspect, it is contemplated that the tuft height and tuft density sensing subsystem 70 of the component waste separation system 40 can comprise means for automatically monitoring both tuft density and tuft height of the carpet waste piece. In one aspect, the means for automatically monitoring both tuft density and tuft height of the carpet waste piece can comprise monitoring a displacement distance in the z-axis substantially transverse to the machine direction of a wide width roller 72. In this aspect, and as shown in FIG. 6, a wide width roller 72 rolls on the top surface, i.e., the face material surface, of the carpet waste piece as it flows through the component waste separation system 40 in the machine direction. The roller is configured to moves up or down relative to the flat surface of the carpet waste piece depending on the relative tuft height or density of the respective carpet waste piece. In another aspect of the tuft height and tuft density sensing subsystem 70, the wide width roller 72 can be is mounted on a set of linear bearings or slides that is connected to a distance sensing mechanism, such as, for example and without limitation, a LVDT (Linear Velocity Displacement Transducer), a laser distance sensor, and the like. In a further aspect of the tuft height and tuft density sensing subsystem 70 can comprise at least one weight, such as, for example and without limitation, a 10 lb weight, that is configured to move in the z-axis into operative contact with the face of the carpet waste piece. In this configuration, the weight can be is mounted on a set of linear bearings or slides that is connected to a distance sensing mechanism, such as, for example and without limitation, a LVDT (Linear Velocity Displacement Transducer), a laser distance sensor, and the like.

Optionally, it is contemplated that the backing thickness sensing subsystem 65 of the component waste separation system 40 can comprise means for automatically detecting the thickness of the backing material of the carpet waste piece. Referring to FIG. 6, means for automatically detecting the thickness of the backing material of the carpet waste piece can comprise at least one backing thickness sensor 67, as exemplarily illustrated. In one example, as shown in option A, the backing thickness sensor comprises a scalloped disk that is configured to roll across the face of the carpet, pressing its scalloped edge between the tufts of the carpet to establish where the backing top is in z-axis space. In another example, as shown in option B, the backing thickness sensor comprises a sharp roller, akin to a pizza cutter, which is configured to roll across the face of the carpet, pressing its sharp edge between the tufts of the carpet to establish where the backing top is in z-axis space. In another exemplary aspect, as shown in option C, the backing thickness sensor comprises a pinned wheel that is configured to roll across the face of the carpet, pressing its pins between the tufts of the carpet to establish where the backing top is in z-axis space. In another aspect of the backing thickness sensing subsystem 65, the backing thickness sensor 67 can be is mounted on a set of linear bearings or slides that is connected to a distance sensing mechanism, such as, for example and without limitation, a LVDT (Linear Velocity Displacement Transducer), a laser distance sensor, and the like. The distance signal, i.e., the backing thickness signal, is sent to the computer control system 80 for conversion and insertion into the process optimization calculations.

It is contemplated that other sensing mechanisms can also be employed for the means for automatically detecting the thickness of the backing material of the carpet waste piece. For example, an optional method for determining the backing thickness is to measure the thickness directly after the cutting zone in the shearing subsystem and thence after removal of the bulk of the available face fiber. This allows the detection device to nest closer to the actual backing materials and can allow for fine tuning of the bottom roller position of the shearing subsystem to help capture a deeper cut of face fiber for increased yield. In this aspect, optionally, and without limitation, a thin wheel, hinged plate, or drop wires connected to a LVDT (Linear Velocity Displacement Transducer) or a laser distance sensor can more accurately detect backing thickness of the carpet waste piece from the residual carcass and in real time as the carpet waste flat is exiting the nip rolls. This methodology can optimize face fiber yield. In a further exemplary method for determining the backing thickness is to use an optical retro-reflective sensor to ping an infrared light off the remaining face fiber and look for a signal back into the sensor. This sensor can be mounted at an angle just above the exiting carcass after the cutting zone in the shearing subsystem. The analog output of the sensor can be used to tune the bottom roll height for maximum yield.

The tuft height and tuft density sensing subsystem 70 of the component waste separation system 40 can comprise means for automatically monitoring both tuft density and tuft height of the carpet waste piece. In one aspect, the means for automatically monitoring both tuft density and tuft height of the carpet waste piece can comprise monitoring a wide roller displacement distance in the z-axis substantially transverse to the machine direction. In this aspect, and as shown in FIG. 10, a wide width roller 72 rolls on the top surface, i.e., the face material surface, of the carpet waste piece as it flows through the component waste separation system 40 in the machine direction. The roller is configured to moves up or down relative to the flat surface of the carpet waste piece depending on the relative tuft height or density of the respective carpet waste piece. In another aspect of the tuft height and tuft density sensing subsystem 70, the wide width roller 72 can be is mounted on a set of linear bearings or slides that is connected to a distance sensing mechanism, such as, for example and without limitation, a LVDT (Linear Velocity Displacement Transducer), a laser distance sensor, and the like. The distance signal, i.e., the tuft height and tuft density signal, is sent to the computer control system 80 for conversion and insertion into the process optimization calculations. It is contemplated that other sensing mechanisms can also be employed for the means for automatically monitoring both tuft density and tuft height of the carpet waste piece.

It is contemplated that the respective backing thickness sensing subsystem 65 and the tuft height and tuft density sensing subsystem 70 allow for the immediate and real time adjustments of the component waste separation system 40 that are necessary for the downstream shearing and separation process in the shearing subsystem 55. Such adjustments can exemplarily include adjusting the servo controlled top roller to the proper location and/or pressure for proper nip, tuft density control and optimal cutting efficiency. Further, the tuft height and tuft density sensing subsystem 70 can be used to operative match the roll pressure to the optimal density that the band blade has to cut through. Optimally, the band blade should cut through the base of each tuft, with the tuft standing primarily in the vertical and natural position. One skilled in the art will appreciate that too much pressure causes the tufts to lie down horizontally, requiring the band blade to cut through more mass, which dulls the blade prematurely.

It is contemplated that the component waste separation system 40 can optionally also include: a means for sensing jams in the shearing subsystem, a means for sensing the band blade life and temperature; and a means for monitoring shearing efficiency. In one aspect, the means for sensing jams in the shearing subsystem (which can occur when a piece of the carpet waste flat or some form of contamination becomes lodged between the bond strips or between a bond strip and the band blade) can comprise at least one optical sensor that are configured and positioned thereon the shearing subsystem to help prevent machine damage that could occur as a result of a jam. Exemplary optical sensors include, without limitation, those made by Keyence, Sick Optics, Telco, Micro-Epsilon or Sunx. In this aspect, an optical sensor can be configured to shoot a beam across, in parallel and on top of the top nip roll. Optionally this optical sensor can be mounted between the top nip roller and top bond strip leading edge. Further in this aspect, a second sensor can be mounted in the same mirror position, but on the bottom side of the shearing subsystem to cover the bottom nip roll. Optionally, it is contemplated that the optical sensors can be mounted on the back or front side of the nip rollers, as compared to the machine direction.

Another optional means for sensing jams in the shearing subsystem comprises using the optical sensors in conjunction with the computer control system 80 can determine if the carpet waste flat is feeding through the machine at the same rate of the nip roll or conveyor feed. If so, the machine is usually running normally. If not, a jam is occurring. Optionally, an idler roller with an encoder, driven by the running carpet waste flat, can also be used to monitor carpet waste flat feed rate compared to the nip or conveyance speed.

The means for sensing the band blade life and temperature can comprise using an optical sensor array to automatically detect in real-time the operative width of the band blade during the course of production as a predictive maintenance scheduling tool. The output signals from the optical sensor can feed back to the computer control system 80 for calculating and displaying the estimated time remaining before a required blade change and projected life of the blade, which allows for proper scheduling of line maintenance. To maximize the life of the band blade and the cutting efficiency, it is contemplated that the temperature of the band blade can be monitored real-time. In one exemplary, non-limiting example, a non-contact infrared temperature sensor is used to sense the temperature of the blade. The temperature data can then be fed to the computer control system 80 for closed loop control of at least one of: carpet waste flat feed speed, top roll pressure, grinding frequency and/or grinding engagement level.

The means for monitoring shearing efficiency can comprise monitoring the blade drive amperage of the shearing subsystem. The temperature data can then be fed to the computer control system 80 for closed loop or open loop control of at least one of: carpet waste flat feed speed, top roll pressure, grinding frequency and/or grinding engagement level. As one skilled in the art will appreciate, higher amperage usually means too much material mass or a dull blade.

In one aspect, the waste stream output monitoring subsystem 75 of the component waste separation system 40 is coupled to the computer control system 80 and comprises means for monitoring the quantity output of fines and mixed fiber produced in the component waste separation system. The waste stream output monitoring subsystem 75 of the component waste separation system 40 can also comprise means for adjusting at least one of: the throughput speed of the component waste separation system 40, the speed of the shearing subsystem, and the force or pressure applied by the shearing subsystem thereon the carpet waste piece. The means for monitoring the quantity output of fines and mixed fiber produced in the component waste separation system can comprise conventional optical, ultrasonic, flow or gravimetric methods to monitor output during the process of shear or otherwise separating the backing material from the primary backing of the carpet waste piece. Based on the overall flow of material through the component waste separation system 40, the force or pressure applied by each of the respective shearing subsystems thereon the carpet waste piece or engagement distance can be adjusted as desired. For example and without limitation, this adjustment can be also based on the rotational amperage being applied to the respective shearing subsystems, which is related to a gradual loss of the effective level or degree of abrasiveness of the shear surfaces of the shearing subsystems over time.

As one will appreciate from the discussion above, it is contemplated that several variables are being sensed real time in component waste separation system 40. These parameters being sensed, as data inputs, can comprise at least one of: backing thickness, pile height, pile density, incoming carpet waste material flat piece width, and shearing subsystem rotational motor load. Using this input data, the computer control system 80 can selectively adjust the relative position of the respective shearing subsystem to the engagement distance calculated by the computer control system 80 for optimal processing conditions.

In another aspect, after deconstruction of the carpet waste piece in the component waste separation system 40, each material waste stream goes through its own system to be further cleaned, separated and opened. Optionally, the face fabric waste stream can be mixed with the primary backing waste stream for subsequent processing to reduce capital expenditures. Typically, after the various carpet components have been separated, each respective waste stream requires additional processing in order to become usable material. Referring now to FIG. 1, exemplary processing of the respective waste streams as shown.

In one example, the separated face material or fiber waste stream is urged to a conventional condenser via a conventional blower system, for example, a vacuum conveyor system. The condenser is configured to remove unwanted dust and particulate matter in preparation for subsequent delivery to a conventional step cleaner. The step cleaner is configured to remove unwanted dust and particulate matter, such as, for example and without limitation, dirt, calcium carbonate, and the like, from the face material or fiber waste stream. After the step cleaner, the face material or fiber waste stream can be delivered to another conventional blower/condenser for final cleansing or removal of unwanted dust and particulate matter. Finally, the cleansed face material or fiber waste stream can be delivered to a baling station for baling. In this example, the separated unwanted dust and particulate matter is delivered to a bag house/waste facility.

In one example, the separated backing material waste stream, comprising backing material having some degree of face fiber, is delivered to a conventional cyclone separator to separate any fines from the backing material having some degree of face fiber. The separated fines are delivered downstream to the bag house/waste facility and the separated backing material having some degree of face fiber waste stream is delivered to a downstream size reduction apparatus configured to tear the waste stream material into fibrous lengths. This size reduction can optionally be repeated in a secondary downstream size reduction apparatus in preparation for subsequent delivery to a conventional step cleaner. The step cleaner is configured to remove unwanted dust and particulate matter, such as, for example and without limitation, dirt, calcium carbonate, and the like, from the backing material having some degree of face fiber waste stream. After the step cleaner, the cleansed backing material having some degree of face fiber waste stream is delivered to a conventional cutter configured chop or reduce the fibrous materials to a desired length. After the cutter, the backing material having some degree of face fiber waste stream is urged to a conventional condenser configured to remove unwanted dust and particulate matter in preparation for sequential delivery to a conventional fine opener and step cleaner. The respective fine opener and step cleaner is configured to remove unwanted dust and particulate matter, such as, for example and without limitation, dirt, calcium carbonate, and the like, from the backing material having some degree of face fiber waste stream. Finally, the cleansed backing material having some degree of face fiber waste stream can be delivered to a baling station for baling. As in the previous example, the separated unwanted dust and particulate matter is delivered to a bag house/waste facility.

In one example, the separated primary backing material waste stream is delivered to a downstream size reduction apparatus via a conventional conveyor system that configured to configured to meter and control the supply of the primary backing material waste stream to the downstream size reduction apparatus. In one aspect, the downstream size reduction apparatus is configured to tear the waste stream material into fibrous lengths. This size reduction can optionally be repeated in a secondary downstream size reduction apparatus in preparation for subsequent delivery to a conventional step cleaner. The step cleaner is configured to remove unwanted dust and particulate matter, such as, for example and without limitation, dirt, calcium carbonate, and the like, from the primary backing material waste stream. After the step cleaner, the cleansed primary backing material waste stream is delivered to a conventional cutter configured chop or reduce the fibrous materials to a desired length. After the cutter, the primary backing material waste stream is urged to a conventional condenser configured to remove unwanted dust and particulate matter in preparation for sequential delivery to a conventional fine opener and step cleaner. The respective fine opener and step cleaner is configured to remove unwanted dust and particulate matter, such as, for example and without limitation, dirt, calcium carbonate, and the like, from the primary backing material waste stream. Finally, the cleansed primary backing material waste stream can be delivered to a baling station for baling. As in the previous examples, the separated unwanted dust and particulate matter is delivered to a bag house/waste facility.

Without limitation the conventional cleaning equipment described above can be purchased from Dell Orco & Villani Srl, Vecoplan, Wilson Knowles and Sons Ltd, Southern Mechatronics, Signal Machine Company Inc, Kice Industries Inc, Sterling Systems Inc, Pallmann GmbH, OMMI SpA, Pierret Industries Sprl, eFactor 3 LLC, Tria SpA, Weima America Inc, SSI Shredding Systems Inc, Erko-Trützschler GmbH, LaRoche SA, Margasa SL, Schirp, Chiavazza Vergnasco, Timtex GmbH, and others. Conventional cleaning equipment can comprise, without limitation, step cleaners, willows, cyclone separators, vertical vibrating chutes, horizontal vibratory screeners, multi-aspirators, rotary sifters, condensers, guillotine and rotary cutters, fine opening, tearing and other methods of cleaning.

In a further aspect, the system 100 can comprise a method for automating the process for certifying that the fiber waste stream has an appropriate quality. Normally, this is a labor intensive process would be done manually. The system and method 100 can be configured to automate the process, while also creating a real-time tool for monitoring and data logging quality data for helping maintain proper quality control of the system and method 100. As one will appreciate, it is contemplated that physical property threshold limits can be set and any data points beyond those limits can be flagged, which can automatically alert management of the off-quality condition.

One exemplary aspect of the method for automating the process for certifying that the fiber waste stream comprises one or more of the following steps that are directed by the computer control system 80: a) automatically and periodically gather a desired sample by pulling a small amount of fiber from the fiber transfer ductwork, after shearing and cleaning; b) fine grind sheared face fiber to a powder; c) thoroughly mix powder to a fully mixed condition; d) transfer powder to a clear quartz crucible; tamp powder to a high compaction rate to remove air pockets; deposit crucible onto sensing platform; read the spectral data, multiple times, of the sample using a near infrared spectrophotometer; compare the reading to pre-loaded values in the data library; remove and clean crucible with compressed air; automatically generate a certificate of analysis (COA); and repeat process.

As described above, the carpet waste reclamation method and system 100 can optionally comprise a carpet waste preparation method and system 200 that can be configured to prepare the respective carpet waste pieces for use in the reclamation method and system 100. Because the shearing subsystem 55 has an effective maximum operational fiber cutting width, which can be, for example and without limitation, 8 feet and due to the desirability of presenting as much carpet waste material to the shearing subsystem as possible in operation, the carpet waste preparation method and system 200 allows for the production of carpet waste flats in optimum sizes to maximize throughput in the reclamation method and system 100. In various aspects, the carpet waste preparation method and system 200 provides a semi-automated method for cutting the carpet waste flats to multiple predetermined sizes and then provides for sorting the sizes into a common size stacks.

Figure 2:
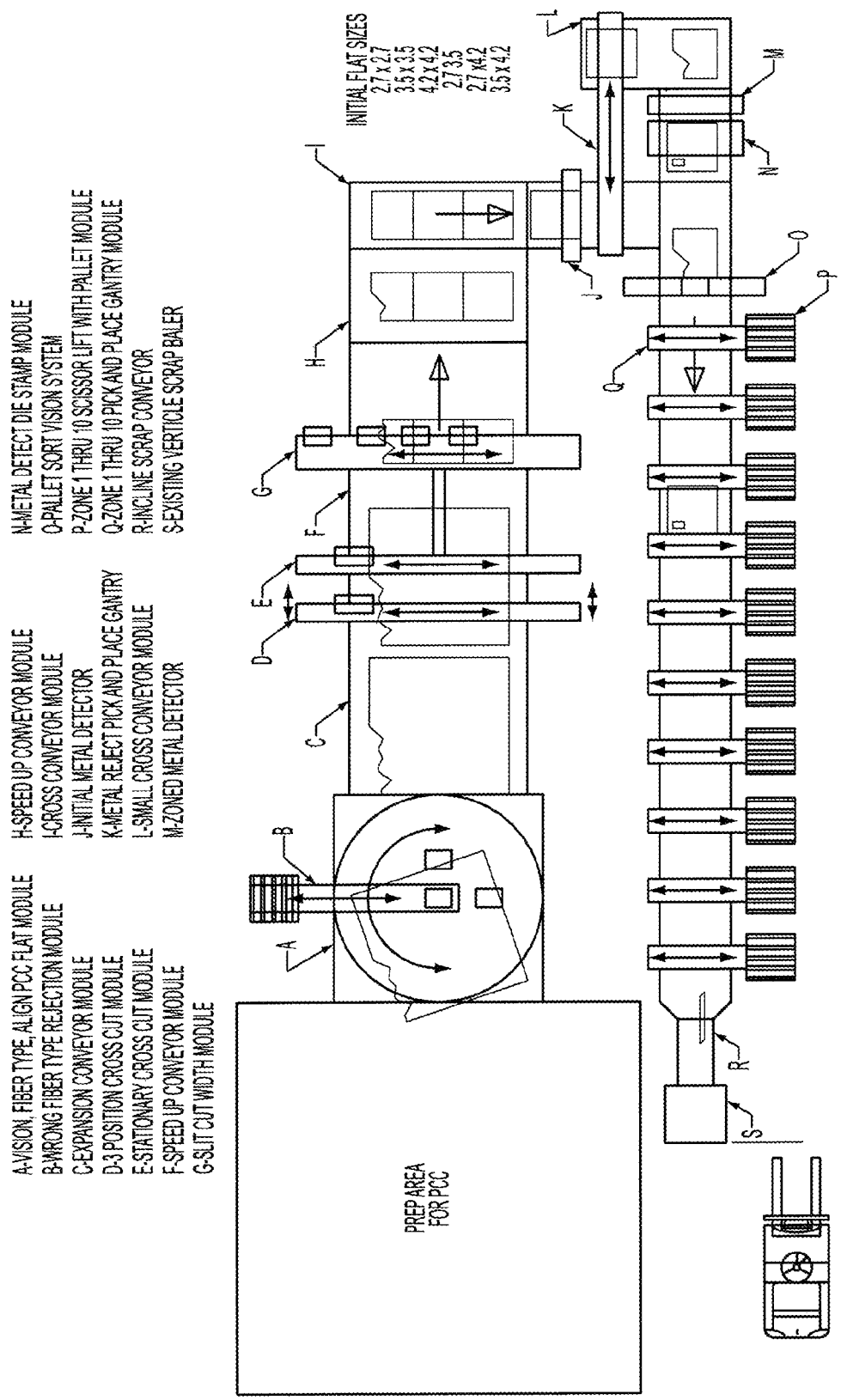
FIG. 2 is a schematic block diagram illustrating the steps performed in a carpet waste piece preparation system.

In various exemplary aspects, and referring to FIG. 2, the carpet waste preparation method and system 200 comprises at least one of the following steps described below. In step 205, a piece of post-consumer carpet waste 10 can be selectively loaded thereon to a conveyor or air table using conventional operator assist devices, such as driven nip rollers or linear actuators with grippers. Optionally, this step can also be used to align two edges of the carpet piece to two opposing wall edges using a conventional tilt air table or other means. In step 210, the size of the carpet waste flat can be determined using conventional machine vision devices and, optionally, the fiber type can be determined using conventional spectrophotometer fiber identification devices. If the targeted fiber type is incorrect, then an overhead pick and place gantry can be used to remove the carpet piece to an offline rejection stack. It is also contemplated that the carpet waste piece can also be rejected if the machine vision camera finds severe or otherwise undesired contamination on the carpet. The data from the machine vision data can be used to determine each carpet waste piece's overall average dimensions and the information is sent to a PLC for determining the optimal orientation of the carpet waste piece for cutting to targeted size. Once inspected, accepted and oriented, the carpet piece is automatically transferred to a feed conveyor for transportation to a downstream cutting machine.

Next, in step 215, the carpet waste flats can individually be cut lengthwise to desired dimensions. In one exemplary aspect, using an exemplary 8 foot operative cutting width for the shearing subsystem, it is contemplated that at least six different sizes of carpet waste pieces can be used as the optimal size carpet waste flats for feeding an eight foot cutting width shearing subsystem. In this example, the optimal carpet waste flat sizes can be: 2.7°×2.7', 3.5°×3.5', 4.2°×4.2', 2.7°×3.5', 2.7°×4.2° and 3.5°×4.2°. Of course these sizes are merely exemplary and other optimal carpet waste flat sizes will be used if desired or if the cutting width of the shearing subsystem differs from the exemplary eight feet.

In the length-wise cutting machine, using the preset target flat lengths, the respective carpet piece is conveyed a predetermined distance to a cross-cutting device for creating the proper length flats. One skilled in the art will appreciate that, by having common dimensions between flats sizes, many side-by-side combinations of dimension carpet waste pieces can be processed in a dual lane configuration to the cutting zone of the shearing subsystem. In a further aspect, this process step allows each piece of incoming carpet waste to be optimally cut into flats of various sizes with a minimal amount of trim waste. In various aspects, it is contemplated that the cutting machine used in this step can comprise two different cross cutting mechanisms. In this aspect, the first cross-cutting mechanism can be configured in a stationary position and can use the conveyance system to sequentially index each carpet waste flat to the proper cutting location. The second cross-cutting mechanism, is configured to cross-cut the carpet waste flat in the machine flow direction to one of three predetermined positions, once the flat is located in the proper location under the stationary cross cutter of the second cross-cutting mechanism. The first and second cross-cutting mechanisms allow for increased throughput and a reduction in cycle time as each carpet piece has to be stopped to during the cross cut operation.

In step 220, a speed up conveyor can be used to transfer the lengthwise dimensioned carpet waste flats to the next cutting zone to create an operational gap between the material to be cut and the next set of pieces in line to be cut. In this step, it is contemplated that sensors can be used to establish an appropriate home position or net point.

Next, in step 225, optimal cutting widths, sensed by a conventional machine vision camera and calculated by a PLC, can be signaled to individual servo motors to move a plurality of slitting devices to the desired width cutting positions. As one will appreciate, this allows multiple and different flat widths to be created for optimal utilization of the initial larger carpet piece and minimal waste. All of the conventional slitting devices are positioned prior to the carpet pieces entering the width cutting zone from the speed up conveyor.

In step 230, after the widthwise cutting has been completed, a speed up conveyor can be configured to quickly transfers the dimensioned carpet waste pieces to a cross conveyor to create another desired gap between the respective dimensioned carpet waste pieces exiting the width-cutting apparatus. In this step, it is contemplated that sensors can be used to establish an appropriate home position, stop or net point.

In step 235, after conveyance to the cross conveyor, the dimensioned carpet waste flat pieces are conveyed perpendicularly to a subsequent conveyor with an integral metal detector to cull out flats with metal content. Exemplary metal detectors can include, without limitation, industrial metal detectors manufactured by Eriez, Fortress, Tectron, ADS and Rapiscan. In this aspect, it is contemplated that the conveyor can further comprise a "metal-free" portion for passing the carpet waste flat and "metal-free" portion through the metal detector's center. In one example, as the dimensioned carpet waste flat is conveyed through the metal detector, inductive coils can be configured to sense for the presence of metal. Once metal is detected a signal is sent, usually to a PLC, to divert the contaminated dimensioned carpet waste flat out of the system as off-quality. In one aspect, an overhead pick and place gantry with pin or clamp grippers can be used to remove the metal laden dimensioned carpet waste carpet flat and transfer the contaminated dimensioned carpet waste flat to an off-conveyor metal extraction station.

If required due to contamination, in step 240, upon arrival at the metal extraction station, a metal detector can be used to establish both an X and Y axis for the center location of the metal contamination in the respective contaminated dimensioned carpet waste flat. Once the center datum is known, then the area with the metal contamination can be cut or otherwise removed using a fixed die cutter or slitting technique to cut around the metal contamination with minimal waste. The contamination reduced piece of dimensioned carpet waste flat can then be passed back through the same or different metal detector a second time for confirmation of removal of the metal contamination. Once a carpet waste piece is determined to be clear of metal contaminates, the dimensioned carpet waste flat is allowed to reenter the queue for placement on to the proper sorted size pallet.

In step 245, the dimensioned carpet waste flats coming from normal line in step 235 and the metal extraction station in step 240 can be merged on a cross conveyor that feeds a downstream system for sorting and stacking flats on to uniform size pallets.

After the metal-free dimensioned carpet waste flats are on the cross conveyor, in step 250, a machine vision camera can be used to measure each carpet waste flat's outside dimensions and location on the conveyor. This data, coupled with the conveyor speed, can then be stored and matched to an appropriate pick and place mechanism for loading on to the appropriate size pallet. In this operation, conventional pick and place gantries with pinch grippers, pin grippers or suction cups can be directed under PLC control to pick up each flat at the appropriate time and stack the flat on to the proper size pallet. When a pallet is full the flats will be placed on a second available stack for filling. Optionally, a rotary turntable that can be configured to hold two or more pallets of a given flat size can be used. In this aspect, the turntable would automatically rotate to an empty position, when the PLC senses that one stack is full. In another optional step, each pallet can be color coded for identifying each specific flat size. It is also contemplated that each pallet station can be mounted on a scissors lift for reducing the amount of vertical travel that the pick and place gantry has to move to place a flat into position on the pallet stack.

Finally, in an optional step 255, if the vision inspection camera or metal detector deems a dimensioned carpet waste flat on the final cross conveyor to be off-quality from excessive contamination with, for example and without limitation, paint, metal, wrong fiber type, or other quality control reason, then the suspect dimensioned carpet waste flat can continue to travel down the cross conveyor, bypassing all pick and place gantries for transfer onto an incline conveyor for conveyance to a baler, waste bin or compactor for further recycling or disposal.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is therefore understood that the invention is not limited to the specific embodiments disclosed herein, and that many modifications and other embodiments of the invention are intended to be included within the scope of the invention. Moreover, although specific terms are employed herein, they are used only in a generic and descriptive sense, and not for the purposes of limiting the described invention.

Various publications are referenced in this document. These publications in their entireties are hereby incorporated by reference into this application in order to more fully describe the state of the art to which the disclosed system and method pertains. The references disclosed are also individually and specifically incorporated by reference herein for the material contained in them that is discussed in the sentence in which the reference is relied upon.

What is claimed is:

1. A system for reclaiming secondary backing materials, primary backing materials, and face materials from carpet waste pieces, comprising:
    a component separation system, comprising:
        a shearing infeed subsystem comprising a drawbridge conveyor that is configured to be movable about and between a substantially horizontal operational position and a substantially vertical maintenance position; and
        a shearing subsystem comprising a band blade system having an endless moving band blade that is configured to contact the incoming carpet waste pieces to separate the face material from at least the primary backing material of the carpet waste pieces;

wherein, when the drawbridge conveyor is positioned in the substantially horizontal operational position;
the shearing infeed subsystem selectively feeds incoming waste carpet pieces to the shearing subsystem; and
the distal end of the drawbridge conveyor is selectively positionable with respect the band blade of the band blade system such that the face materials can be separated at a desired height from at least the primary backing material of the carpet waste pieces.

2. The system of claim 1, wherein the component separation system further comprises at least one of: a carpet waste size sensing subsystem, a backing thickness sensing subsystem, a tuft height and tuft density sensing subsystem, and a waste stream output monitoring subsystem.

3. The system of claim 2, further comprising an infeed conveyor system that is positioned upstream of the component waste separation system, the infeed conveyor system comprising a means for removing wrinkles from each carpet waste piece that is fed into the system.

4. The system of claim 3, wherein the infeed conveyor system further comprises a means for selectively applying a desired pressure transverse to the downstream machine directional flow to the individual carpet waste pieces passing through the infeed conveyor system.

5. The system of claim 1, wherein the component separation system further comprises a tractor feed subsystem.

6. The system of claim 5, wherein the tractor feed subsystem comprises means for selectively indexing individual flattened pieces of carpet waste through the component separation system.

7. The system of claim 6, wherein the means for selectively indexing individual flattened pieces of carpet waste through the component waste separation system comprises a plurality of belts or pin rollers that are configured to maintain the individual carpet waste materials in a desired orientation while urging the carpet waste material through the shearing subsystem.

8. The system of claim 7, wherein the means for selectively indexing individual flattened pieces of carpet waste through the component separation system is configured to nip the carpet as it is moved in the downstream machine direction to affect the desired control of the orientation and metering of the carpet waste material at a specified rate.

9. The system of claim 1, wherein the shearing subsystem is selected from the group consisting of at least one continuous rotating shearer and a segmented rotating shearer.

10. The system of claim 1, wherein the shearing subsystem further comprises means for selectively moving the shearing subsystem and applying desired pressure in a direction transverse to a downstream machine directional flow to the individual carpet waste pieces in order to maintain the desired height of the band blade of the shearing subsystem relative to the primary backing of the individual carpet waste pieces.

11. The system of claim 1, wherein the shearing subsystem further comprises a means for maintaining the band blade at a desired degree of sharpness.

12. The system of claim 1, wherein the component separation system further comprises a carpet waste size sensing subsystem, wherein the carpet waste size sensing subsystem comprises at least one of a computer vision system, a sensor array, and mechanical fingers to detect the width of each carpet waste piece.

13. The system of claim 1, wherein the component separation system further comprises a backing thickness sensing subsystem that is configured to detect the thickness of the primary backing materials of the carpet waste piece.

14. The system of claim 13, wherein backing thickness sensing subsystem comprises at least one backing thickness sensor.

15. The system of claim 14, further comprising a set of linear bearings that is connected to a distance sensing mechanism, wherein the backing thickness sensor is mounted on the set of linear bearings.

16. The system of claim 1, wherein the component separation system further comprises a tuft height and tuft density sensing subsystem.

17. The system of claim 16, wherein the tuft height and tuft density sensing subsystem monitors a displacement distance in the z-axis substantially transverse to the machine direction of a wide width roller that is configured to roll over the face material of the carpet waste piece.

18. The system of claim 1, wherein the carpet waste materials comprise at least one of: post-consumer carpet, post-consumer processed carpet; post-industrial carpet, manufacturing remnants, and quality control carpet failures.

19. The system of claim 1, wherein the carpet waste materials comprise at least one of: tufted carpet, needle-punched carpet, and hand woven carpet.

20. The system of claim 1, wherein the carpet waste materials comprise at least one of: tufted carpet, needle-punched carpet, and hand woven carpet.

21. The system of claim 1, wherein the face materials comprise face fiber.

22. A system for reclaiming secondary backing materials, primary backing materials, and face materials from carpet waste pieces, comprising:
a shearing inked subsystem comprising a drawbridge conveyor that is configured to be movable about and between a substantially horizontal operational position and a substantially vertical maintenance position; and
a shearing subsystem comprising a band blade system having an endless moving band blade that is configured to contact the incoming carpet waste pieces to separate the face materials from at least the primary backing material of the carpet waste pieces;
wherein, when the drawbridge conveyor is positioned in the substantially horizontal operational position;
the shearing infeed subsystem selectively feeds incoming waste carpet pieces to the shearing subsystem; and
the distal end of the drawbridge conveyor is selectively positionable with respect the band blade of the band blade system such that the face materials can be separated at a desired height from at least the primary backing material of the carpet waste pieces.

* * * * *